United States Patent Office 3,328,291
Patented June 27, 1967

3,328,291
HYDROCARBON CONVERSION PROCESS USING CATALYSTS HAVING METALS DEPOSITED ON SILICEOUS SUPPORTS
Bernard F. Mulaskey, Pinole, Calif., assignor to Chevron Research Company, San Francisco, Calif., a corporation of Delaware
No Drawing. Filed Jan. 24, 1966, Ser. No. 522,344
7 Claims. (Cl. 208—111)

This application is a continuation-in-part of my copending application Ser. No. 192,356, filed May 4, 1962, now abandoned.

This invention relates to processes for converting hydrocarbons in hydrocarbon fractions to lower boiling hydrocarbons by contacting with hydrogen and catalysts. More particularly, the invention relates to such processes using novel catalysts comprising metals which form ammine complexes, or which are soluble in ammonium hydroxide solutions, deposited on silica-containing carriers.

Metals or metal compounds are commonly deposited on refractory oxide supports or carriers as a means of preparing solid catalysts. The most widely used method is impregnation. In the impregnation technique, the metal concentration in the final catalyst is fixed predominantly by the metal concentration in the impregnating solution and by the pore volume of the carrier. The mechanism is substantially the same whether an acid, neutral, or basic aqueous impregnating solution or a nonaqueous solution is used. The impregnating solution is physically adsorbed in the pores of the carrier, which may be natural or synthetic silica, alumina, magnesia, titania, zirconia, natural earths and clays, etc., or mixtures or compounds of two or more of the foregoing. The pores of such materials have been pictured as analogous to small channels or capillaries; but when the carrier is amorphous, probably the pore volume is actually a measure of the volume of interstices between the minute particles of the amorphous materials. If the carrier is crystalline, as in the case of crystalline alumino-silicate zeolites, the pore volume includes space within the three-dimensional cage structure or network of these so-called "molecular sieves," and also interstitial space between the usually minute crystals if they have been compacted or otherwise formed into larger particle agglomerates, for example using amorphous silica-alumina gel as a binder. Whatever the nature of the pores, when the excess impregnating solution is drained from the carrier, and the carrier then dried and/or calcined, the liquid trapped within the pores evaporates leaving the metals impregnated therein. Prior to calcining, the impregnating solution in the pores can be washed out or displaced, for example, by water. After calcining, some of the impregnated metal is tightly bound to the carrier, but most of it is on the surface and readily extractible by chemical means without affecting the carrier.

The conversion process of this invention comprises contacting a hydrocarbon fraction at a temperature in the range of 400–900° F. and a pressure in the range of 500–5000 p.s.i.g. with hydrogen and certain novel catalyst compositions consisting essentially of a silica-containing mixed-oxides carrier having a hydrogenation promoting metal component deposited thereon by chemisorption as described hereinafter. The novel catalysts are particularly active in converting hydrocarbons contained in the hydrocarbon fraction to lower boiling hydrocarbons by the action of hydrogen at the named conditions, i.e. for hydrogenating and hydrocracking. The hydrocarbon fraction may be an impure raw oil such as a straight run petroleum distillate, or it may be a fraction resulting from previous cracking or other conversion of petroleum or similar material or fractions thereof. In some cases it is desirable to eliminate contaminants such as sulfur and nitrogen compounds from the hydrocarbon fraction feed to the process, but this is not always essential. The contacting may be done by passing the hydrocarbon fraction and hydrogen at reaction conditions through one or more beds of catalyst particles in a reaction vessel, or various other well known contacting techniques may be used.

The process of this invention uses catalysts prepared by a novel method to deposit a hydrogenation promoting metal on a silica-containing carrier in a form more tightly bound to the carrier and less extractible than impregnated metal. The method of depositing the metal component, in accordance with one embodiment of the invention, comprises chemisorbing the maximum amount of the metal preferentially on the silica portion of the siliceous mixed-oxides carrier by contacting said carrier with a solution of an ammine complex of the metal in concentrated aqueous ammonia.

It has been discovered that metal-ammine complexes in concentrated aqueous ammonia solution apparently chemisorb only on silica or on the silica portion of a silica-containing mixed-oxides carrier. This is surprising, because the silica is not an acidic-reacting material, and it would not be expected to have any special affinity for the metal-ammine complex. It has also been found that no more than a certain maximum amount of ammine complex of a given metal can be chemisorbed on a given siliceous carrier. The capacity of a carrier to chemisorb a particular metal-ammine complex is a property of the particular carrier, and it may be affected by the method of preparation of the carrier and by prior treatments given the carrier. In one sense, maximum chemisorption is achieved when the chemisorption capacity of the carrier is substantially satisfied. In another sense, maximum chemisorption is achieved when the solution has been essentially depleted of metal.

The attainment of maximum chemisorption is readily observed in the case of metals such as cobalt, nickel, copper, and silver, because their solutions of metal-ammine complex in aqueous ammonia are highly colored. As chemisorption proceeds, the concentration of metal in solution decreases, which is reflected in a noticeable change in the intensity of the color, if the solution is not too concentrated. When no further color change is evident, chemisorption is considered substantially complete. If the metal-ammine complex solution is not colored, the progress of chemisorption can be followed by analyzing periodically the solution in contact with the carrier.

In the past, catalysts have been prepared by impregnation of amorphous carriers with an ammoniacal solution of a metal. A small amount of chemisorption, only about one-fourth or less of capacity, inherently accompanied such impregnation of carriers containing silica, but the phenomenon was not recognized as taking place. Because chemisorption was not appreciable, it was not realized that the chemisorbed metal is preferentially on the silica and more tightly bound to the carrier than the impregnated metal. Hence, there was no attempt either to substantially satisfy the chemisorption capacity of the carrier or to deposit the metal only by chemisorption to the exclusion of impregnation or precipitation.

Also, catalysts have been prepared by treating crystalline alumino-silicate zeolites with metal-ammine complexes in ammonia-free solutions at conditions for displacing or ion-exchanging cations in the zeolite lattice with the metal-ammine complex cations. These methods either exclude the presence of metal promoter in any position other than as an exchanged cation, or else permit the usual impregnation-precipitation to occur as well.

In the new method the carrier is contacted with the ammoniacal metal-containing solution at conditions for maximum chemisorption with minimal deposition of metal by precipitation, impregnation, or ion exchange. The principal conditions to be considered are carrier particle size, metal concentration in the solution, and time.

For maximum chemisorption of the metal on the carrier, the carrier should be in the form of particles smaller than about 14 mesh, preferably smaller than 100 mesh, especially in the form of fine powder. Maximum chemisorption is not readily achieved with larger particles such as pellets, because the solution diffusing into the pellets is progressively depleted in metal content. Hence, an inordinately long contact time would be required, or a very concentrated solution would have to be used, or the concentration of chemisorbed metal would be less at the inside than on the outside of the pellet. After depositing the metal on the small carrier particles in accordance with the invention, the resulting composite may then be formed into larger shaped particles such as pellets or extrusions, if desired.

The carrier on which the metal component is to be deposited is a solid refractory oxide containing silica, desirably a high-area, microporous, material. The carrier will contain other components in addition to silica, such as alumina, titania, zirconia, and/or magnesia, but the silica portion should be substantial, usually at least about 25% of the total. Highly useful catalytic materials are prepared using as the support an amorphous silica-alumina carrier containing above 25% and up to 90% silica, for example, a silica-alumina cogel. Superior catalysts can be prepared using crystalline alumino-silicate zeolites containing 40–80% silica as the carrier for certain hydrogenation promoting metal components.

The metal to be deposited on the carrier must be one which is capable of forming an ammine complex in concentrated aqueous ammonia solution, or which is soluble in ammonium hydroxide and forms an insoluble silicate. Metals known to form such complexes readily are cobalt, nickel, copper, gold, and silver. Other metals exhibiting this property to a lesser extent include iron, magnesium, zinc, cadmium, strontium, cerium, thorium, and the platinum-palladium group metals. The metal should not form a salt with ammonia.

The solution of metal-ammine complex is best formed by dissolving an acidic salt, such as the nitrate, chloride, carbonate, acetate, etc., of the metal in concentrated aqueous ammonia. After 3 to 6 mols of ammonia per mol of metal are required to form the complex. Also, excess ammonia is desirably present. Hence, the solution of metal-ammine complex will have a pH of at least 10, and usually of about 13. The solution can be relatively dilute with respect to metal concentration, preferably less than about 1 molar. Nevertheless, high metal concentrations on the carrier can be achieved because the amount of metal chemisorbed is determined by the chemisorption capacity of the carrier for the particular metal, rather than by the solution concentration. The ability to use dilute solutions makes the method particularly advantageous to deposit metals which are only slightly soluble.

An ammine complex may also form in nonaqueous or nonammoniacal solutions. However, it is important for the chemisorption of the invention that both the ammine and the solution be strongly basic and ionic. Hence, solutions other than aqueous ammonia are of limited applicability. The ionic strength may be increased by including nonmetallic ammonium salts, such as carbonates, halides, etc., in the solution. The solution may be kept saturated with ammonia by bubbling $NH_3$ gas through it. In the examples hereinafter where reference is made to concentrated aqua ammonia, this was the reagent grade 28–30% $NH_3$ solution.

In contrast to the physical adsorption occurring in the usual impregnation techniques, which is quite rapid and usually completed within a few minutes, the chemisorption ocurring in the preparation of catalysts for this invention is relatively slow. The contact time required between the siliceous carrier and the ammoniacal solution for maximum chemisorption depends to some extent on the size of the carrier particles, the concentration of metal in the aqueous ammoniacal solution, and the metal concentration desired on the carrier. Chemisorption may be nearly completed within 30 minutes in the case of a powdered carrier and a reasonably concentrated solution. Usually about 2 hours or longer is required. In general, the chemisorption will be completed within 24 hours, though longer contact times may be used. Unless superatmospheric pressure is imposed, the temperature during chemisorption is preferably maintained near atmospheric conditions, to avoid loss of ammonia by evaporation, but warm enough for reasonably rapid diffusion of metal to the carrier and chemisorption. When the carrier is contacted with the ammoniacal metal solution at its boiling point, the metal does not chemisorb selectively. Thus, ordinary room temperature is desirable for process reasons as well as being convenient.

The amount of solution used need be only that amount which contains initially in solution the amount of metal corresponding to the chemisorption capacity of the carrier, or less if a low metal content catalyst is desired. However, it is preferred to use excess solution in order to reduce the contact time required. In the chemisorption method, the concentration of metal in the solution gradually declines as metal-ammine complex is abstracted from the solution and chemisorbed on the carrier. The final concentration of metal chemisorbed on the carrier is then fixed by the intrinsic properties of the support in terms of chemisorption capacity, which is independent of the solution concentration above the minimum amount needed to provide the amount of metal desired to be deposited. That is to say, a fixed metal concentration will be achieved provided that sufficient time is allowed for completion of the chemisorption and provided that there is sufficient metal present in the amount of solution used. If less metal is present than the chemisorption capacity of the carrier, the solution will be depleted of metal.

As previously mentioned, the time of contact for maximum chemisorption is relatively long. In impregnation, the ultimate maximum metal concentration is achieved in contact times between the carrier and the solution as short as a few minutes, and rarely over 15 minutes is required. If the carrier is withdrawn from the aqueous ammoniacal solution of metal-ammine complex before more than about 15 minutes of contacting, the amount of metal deposited is found to be only a little more than that which would be obtained by impregnation. If, however, the solution is allowed to contact the carrier particles for a much longer time, preferably about two hours or longer, a much higher metal concentration is achieved.

It is quite apparent that both chemisorption and impregnation can take place during contacting of the carrier with the solution, except in the situation where only sufficient metal is provided in the original solution to satisfy the chemisorption capacity. Thus, if excess solution is used, or if the solution is more concentrated than necessary, after the carrier has chemisorbed the metal up to its capacity, there will still be metal-containing solution adsorbed in the pores. Hence, when this impregnated material is dried, the total metal concentration of the carrier will be higher, equal to the sum of chemisorbed and the impregnated metal.

In the preferred catalysts for the conversion process of this invention, chemisorption predominates. It is especially desired that the metal component be deposited essentially by chemisorption, which is considered to be the case when the weight of metal deposited on the carrier is at least three times the weight of metal which would be deposited thereon if the support were impregnated with a nonammoniacal solution of the same metal concento deposit cobalt on a pulverized silica gel carried by impregnation and by chemisorption. The data obtained, presented in the following Table III, again show that there is a constant difference between the metal content of the chemisorbed catalyst and that of the impregnated catalyst, in this case about 4–5 weight percent, representing the chemisorption capacity of the carrier. Up to a solution concentration of 0.5 molar, the weight of metal deposited on the carrier by the chemisorption method is over three times the weight of metal deposited on the carrier by impregnation with an aqueous solution of the same metal concentration.

TABLE III

| Cobalt Acetate in Solution, Mols/Liter | Wt. Percent Cobalt on Silica Gel | |
| --- | --- | --- |
| | Impregnation with Distilled Water Solution | Chemisorption from Ammoniacal Solution |
| 0.125 | 0.5 | 4.8 |
| 0.25 | 1.0 | 5.5 |
| 0.50 | 2.1 | 7.2 |
| 1.0 | 3.9 | 9.4 |

Silica gel itself is not a particularly good carrier or support for the hydrogenation promoting metal component, the catalysts having low activity for converting hydrocarbons to lower boiling hydrocarbons. The above data show, however, the specificity of the chemisorption for silica.

The following Examples 4–7 illustrate the preparation and use for hydrocracking of catalysts in accordance with the invention.

Example 4

An 86% silica–14% alumina cogel cracking catalyst in the form of 10–28 mesh particles was contacted for several days with a dilute solution of nickel carbonate (about .05 molar) in concentrated (saturated) ammonium hydroxide. The contacted silica-alumina was drained free of excess solution, dried, heat treated at 1400° F. for two and one-half hours, reduced two hours at 800° F. in hydrogen, and sulfided for two hours at 600° F. in $H_2S$. The catalyst contained 5.24% nickel. Only 0.5% nickel, or less, would be obtained by impregnating with a non-ammoniacal solution of the same nickel content. Normal decane was passed over this 5.24% Ni catalyst, sulfided in a laboratory reactor at a rate of 16 volumes of decane per volume of catalyst per hour, at 1200 p.s.i.g., 500° F., with hydrogen in a mol/ratio of hydrogen to n-decane of 10 to 1. The n-decane was hydrocracked to lower boiling products to the extent of 5.1 weight percent, which indicates a good hydrocracking activity, in view of the high space velocity and low temperature used.

Example 5

A 5 gram sample of commercial synthetic crystalline sodium alumino-silicate zeolite, designated "Zeolite 13X" by the supplier, Linde Co., with the approximate composition $Na_2O \cdot Al_2O_3 \cdot 2SiO_2$ and in the form of particles crushed to about 20 mesh or smaller, was immersed in 200 ml. of concentrated aqueous ammonia containing nickel acetate at 0.05 molar concentration and allowed to stand at room temperature with occasional stirring, for one day. The particles were then filtered from the solution, dried and calcined, and analyzed and found to contain 2.35 wt. percent nickel. In the same way, alumino-silicate based catalysts containing, respectively, 3.24 wt. percent cobalt, 4.13 wt. percent copper, 7.55 wt. percent silver, were prepared. These catalysts are all useful in hydrocracking hydrocarbons, though the copper and silver catalysts are less active than the cobalt and nickel, and the latter are less active than many similar catalysts prepared on amorphous silica-alumina carriers. The relatively lower activity is attributable to the sodium present in the zeolite, as alkali metals are notorious offenders in adversely affecting cracking reactions.

Example 6

Palladium chloride, about 10 grams, was dissolved in about 3½ liters of concentrated (28–30%) aqua ammonia at room temperature, giving about a 0.015 molar metal solution. To this was added 1 pound of synthetic alumino-silicate zeolite crystals essentially free of alkali metal and alkaline earth metal cations, designated "decationized ammonia Y sieve" by the supplier, Linde Co., having the approximate composition $Al_2O_3 \cdot 5SiO_2 \cdot YH_2O$ and in the form of a crystal powder smaller than 100 mesh, and the mixture was allowed to stand 2–3 days at room temperature with occasional stirring. The one pound of molecular sieve is on a dry basis, the material as obtained containing about 30–40% water of hydration. The crystals were filtered from the supernatant solution, dried at 150° F., tabletted, crushed to 8–14 mesh, and calcined 2 hours at 1000° F. The finished catalyst, analyzing 1.22% Pd, was tested for hydrocracking activity, by contacting a partially hydrofined catalytic cycle oil, 400–700° F. boiling range, containing 20 p.p.m. organic N and 0.3 wt. percent sulfur, at 1600 p.s.i.g. with 12,000 s.c.f. of hydrogen. At 625° F., conversion to lower boiling hydrocarbons, $C_4$—400° F., was 60%.

In the above Example 6 the metal-ammonia solution was so dilute with respect to metal content that the chemisorption capacity of the carrier was not satisfied, the solution being depleted of metal. In other tests it was shown that the Pd content of the catalyst could be adjusted in a range up to 4% Pd by using a more concentrated metal solution.

A catalyst prepared similarly in accordance with Example 6, containing 2% platinum instead of palladium, had slightly better activity than the 1% Pd catalyst. Thus, the chemisorption capacity of the carrier for the metal need not be completely satisfied to provide an effective catalyst, provided the metal present is deposited predominantly by chemisorption.

Example 7

Cobalt chloride hexahydrate, 198 g., was dissolved in about 3½ liters of concentrated aqua ammonia, and one pound (dry basis) of the "ammonia-Y sieve" described previously was added. The solution thus was about 0.24 molar in cobalt concentration. Following the same procedures of letting stand, filtering, etc., and calcining as in Example 6, there was produced a catalyst containing 6.85% Co which had good hydrocracking activity and stability when sulfided. In this case the chemisorption capacity of the carrier was satisfied, and the ammoniacal solution used in the preparation still contained cobalt.

The following example shows that the metal deposited by chemisorption is attached to the carrier more tightly and in a different manner than that deposited by impregnation, whereby the chemisorbed metal is less extractible.

Example 8

It has been found that a portion of the nickel oxide on a calcined impregnated catalyst can be extracted by complexing it with dimethylglyoxime and dissolving the resulting nickel complex in an organic solvent. Sulfiding makes the nickel more extractible. A weighed amount of the catalyst powder is dropped into a large volume of a 50:50 mixture of absolute alcohol and chloroform containing dimethylglyoxime. The catalyst is allowed to stand in contact with the solution for one day. The amount of nickel extracted is then determined by measuring the optical transmission of the solution. From a calcined 5.4% nickel-on-silica-alumina catalyst prepared by the usual impregnation technique, 100 micromols of nickel per gram were extracted in this manner. From a calcined 5.24% nickel catalyst prepared by chemisorbing nickel ammonium carbonate on silica-alumina, as in Example 4, only 15 micromols of nickel per gram were extractable. Samtration. This situation can be readily achieved by using a dilute metal-ammine solution. Thus, there is a particular advantage in using dilute solutions, because the chemisorption capacity of the carrier can be satisfied without any substantial amount of metal being deposited also by impregnation. Since the chemisorption occurs only on the silica portion of the carrier, with carriers of low silica contents correspondingly dilute metal-ammine solutions but the chemisorption method produced very high metal concentrations. In the case of the 86% silica–14% alumina, very little metal was deposited by the impregnation technique, but the chemisorption method again gave high metal concentrations. The excess solutions were also analyzed, and in the cases of chemisorption on silical gel and silica-alumina were found to be reduced in metal content.

TABLE I

| Metal Solution | Weight Percent Metal on Alumina | | | Weight Percent Metal on Silica Gel | | | | Weight Percent Metal on 86% Silica, 14% Alumina | | | |
| --- | --- | --- | --- | --- | --- | --- | --- | --- | --- | --- | --- |
| | Copper | Nickel | Silver | Cobalt | Copper | Nickel | Silver | Cobalt | Copper | Nickel | Silver |
| Distilled Water | 0.86 | 0.53 | | Nil | 0.95 | Nil | | 0.35 | 0.57 | 0.35 | |
| Aqueous Ammonia | 0.95 | 0.88 | 0.54 | 7.06 | 8.26 | 5.58 | 8.62 | 4.42 | 6.04 | 3.55 | 7.55 | must be used in order to obtain at least three times the metal content on the carrier as would be obtained by impregnation with a solution of that same metal concentration. Otherwise, a large amount of impregnation would occur along with the chemisorption.

The metal can be deposited preferentially on the silica by chemisorption even if a more concentrated metal ammine solution is used, Thus, any excess impregnating solution within the pores may be washed out, as by displacing with distilled water, prior to drying and calcining the particles. The chemisorbed metal is not removed by this treatment because it is tightly bound to the carrier. Additional metal, for example, a different metal, may then be deposited by impregnation or otherwise on the metal-containing particles prepared by this chemisorption technique, preferably after fixing the metal by drying and calcining. In particular, in the case of a silica-alumina carrier, additional metal may be deposited preferentially on the alumina portion by adsorption from an aqueous metal fluoride solution, by the method disclosed in U.S. Patent No. 3,140,925 to R. H. Lindquist and R. O. Billman. Different results are obtained by this method, as compared to the results obtained when excess impregnating solution is not washed off, because the chemisorption itself often causes changes in the structure of the carrier with respect to decreasing surface area, increasing pore volume, and expanding pore diameters, for example. The extent of such changes can be controlled by adjusting the metal concentration in the solution and consequently the time required for chemisorption. By thus depositing a metal by chemisorption only on the silica portion of a mixed-oxides carrier, thereby altering the properties of the carrier, and then depositing additional metal, catalysts having new and novel properties can be prepared.

The following example demonstrates that the chemisorption described herein takes place only on silica or on the silica portion of a mixed-oxides carrier, and does not occur to any noticeable extent on an alumina carrier.

*Example 1*

Metals were deposited on three carriers, a powdered alumina, a powdered silica gel, and a powdered 86% silica–14% alumina, by two procedures. In one case the carriers were impregnated by immersing 5 grams of the carrier in 200 cc. of solution of the metal acetate in distilled water, which had a concentration of 0.05 molar with respect to the metal. In the other case, for chemisorption, 5 grams of each carrier were immersed in 200 cc. of 0.05 molar solution of the metal acetate in concentrated (30%) ammonium hydroxide. The carriers were allowed to stand in contact with the solutions for one day. The carriers were then withdrawn from the solutions, dried and calcined, and then analyzed for metal content. As shown in the following Table I, which presents the data obtained, very little metal was deposited on the alumina by either impregnation or by chemisorption, using these dilute solutions. Very little metal was deposited on the silica gel by the impregnation technique, Thus, it is apparent that the chemisorption method deposits the metal preferentially on the silica portion of the carrier. Also, much higher metal concentrations are obtained on silica-containing carriers by this chemisorption method as compared to impregnation techniques, using very dilute solutions.

The following Examples 2 and 3 further illustrate the higher metal concentrations obtainable by the chemisorption method, and show that in contrast to impregnation, where the metal concentration on the carrier is proportional to the concentration of metal in the solution, in chemisorption the metal concentration achieved is primarily a property of the carrier.

*Example 2*

Solutions of varying concentrations of nickel nitrate were prepared both in distilled water (for impregnation) and in concentrated aqueous ammonia (for chemisorption). Portions of 86% silica–14% alumina pulverized cracking catalyst were then contacted with the solution for 24 hours, drained free of excess solution, dried, calcined, and analyzed for metal content. The data obtained, presented in Table II, show that high metal concentrations are obtainable by the chemisorption method, even with very dilute solutions. At a solution concentration below about 1 molar, the quantity of metal deposited on the support is more than three times that which is deposited by impregnation using an aqueous solution of the same metal concentration.

TABLE II

| Nickel Nitrate in Solution, Mols/Liter | Wt. Percent Nickel on 86% Silica, 14% Alumina | |
| --- | --- | --- |
| | Impregnation with Distilled Water Solution | Chemisorption from Ammoniacal Solution |
| 0.05 | 0.2 | 2.9 |
| 0.5 | 1.2 | 4.6 |
| 1.0 | 2.1 | 7.6 |
| 2.0 | 4.9 | 8.5 |

The concentration of metal on the carirer also increases with increasing metal concentration in the solution by the above chemisorption, because a portion of the metal deposited thereon is impregnated. If the impregnated portion is removed, as can be done by water washing before calcining, a substantially constant metal content of about 3–5% is obtained by the chemisorption method, independent of the nickel concentration in the solution. This is the chemisorption capacity of the carrier. The chemisorbed metal is more tightly bound to the support than the impregnated metal, and it cannot be removed by mere water washing.

*Example 3*

In this example experiments were carried out in substantially the same manner as in the foregoing Example 2, except that solutions of cobalt acetate in distilled water and in concentrated aqueous ammonia were used ples of the catalysts were also sulfided and then subjected to the extraction with dimethylglyoxime. From the impregnated catalyst 625 micromols of nickel per gram were extracted, but only 160 micromols per gram could be extracted from the chemisorbed catalyst.

In the case of the chemisorbed catalyst, it is seen that the small amount of extractible metal can be largely accounted for as due to the small amount of nickel impregnated nonselectively on the silica-alumina (about 0.5%), while the metal chemisorbed preferentially on the silica portion (about 4.7%) is much less extractible. Thus, the silica-alumina carrier on which nickel was deposited by chemisorption had about 5 grams of nickel not extractible with dimethylglyoxime per 100 grams of silica chemisorbed on the silica portion of the carrier, only about 0.5 gram of nickel per 100 grams of alumina supported on the alumina portion. Independent of the relative amounts of silica and alumina in the carrier, compositions can thus be prepared having 3–10 grams of chemisorbed nickel per 100 grams of silica on the silica portion and not over 1 gram of nickel per 100 grams of alumina on the alumina portion.

To summarize, it has been shown that metals which form complexes with ammonia deposit selectively on a siliceous mixed-oxides carrier when the carrier is treated with a dilute solution of the metal in concentrated aqua ammonia at room temperature, such that the metal is more tightly bound to the carrier and less extractible than metal deposited by impregnation. The resulting catalysts are active for hydrocracking oils, i.e. converting hydrocarbons in hydrocarbon fractions to lower boiling hydrocarbons in the presence of hydrogen, when there is so deposited a hydrogenation promoting metal component comprising nickel, cobalt, or a noble metal of the platinum-palladium group. The cobalt and nickel catalysts are best used with the metals present as sulfides whereas the platinum and palladium may remain as elemental metal during use.

I claim:
1. Method of converting hydrocarbons in a hydrocarbon fraction to lower boiling hydrocarbons which comprises contacting said fraction at a temperature in the range of 400–900° F. and a pressure in the range of 500–5000 p.s.i.g. with hydrogen and a catalyst composition consisting essentially of a silica-containing mixed-oxides carrier, composed of at least 25% silica and at least one other oxide selected from the group consisting of alumina, titania, zirconia, and magnesia, and having a hydrogenation promoting metal component deposited thereon by contacting particles of said carrier smaller than 14 mesh with a dilute solution of an ammine complex of the metal, less than one molar with respect to metal content, in concentrated aqueous ammonia at about room temperature avoiding ammonia vaporization, for at least two hours until said carrier has chemisorbed the maximum possible amount of said metal from said solution, separating said particles from contact with said solution, and thereafter drying and calcining the particles.

2. Method according to claim 1 wherein said mixed-oxides carrier comprises a synthetic silica-alumina cracking catalyst.

3. Method according to claim 2 wherein said metal component is nickel or cobalt sulfide.

4. Method according to claim 2 wherein said metal component is a noble metal of the platinum-palladium group.

5. Method according to claim 1 wherein said mixed-oxides carrier comprises a crystalline alumino-silicate zeolite.

6. Method according to claim 5 wherein said metal component is nickel or cobalt sulfide.

7. Method according to claim 5 wherein said metal component is a noble metal of the platinum-palladium group, and said crystalline alumino-silicate zeolite carrier contacted with said solution is essentially free of alkali metal and alkaline earth metal cations.

References Cited

UNITED STATES PATENTS

| | | | |
|---|---|---|---|
| 2,777,805 | 1/1957 | Le Francois et al. | 208—139 |
| 3,135,682 | 6/1964 | Mason et al. | 208—111 |
| 3,226,339 | 12/1965 | Frilette et al. | 208—138 |

DELBERT E. GANTZ, *Primary Examiner.*

A. RIMENS, *Assistant Examiner.*